(12) United States Patent
Suzuki et al.

(10) Patent No.: US 6,752,506 B2
(45) Date of Patent: Jun. 22, 2004

(54) SPREAD ILLUMINATING APPARATUS WITH LIGHT REFLECTION MEMBER

(75) Inventors: Shingo Suzuki, Iwata-gun (JP); Toru Kunimochi, Iwata-gun (JP)

(73) Assignee: Minebea Company, Limited, Miyota-Machi (JP)

( * ) Notice: Subject to any disclaimer, the term of this patent is extended or adjusted under 35 U.S.C. 154(b) by 172 days.

(21) Appl. No.: 10/189,626

(22) Filed: Jul. 8, 2002

(65) Prior Publication Data

US 2003/0012009 A1 Jan. 16, 2003

(30) Foreign Application Priority Data

Jul. 13, 2001 (JP) ........................................ 2001-213730

(51) Int. Cl.[7] .................................................. F21V 7/04
(52) U.S. Cl. ........................... 362/31; 362/26; 362/555; 362/560
(58) Field of Search .............................. 362/26, 27, 31, 362/555, 556, 560; 349/65

(56) References Cited

U.S. PATENT DOCUMENTS 6,293,683 B1 * 9/2001 Okada .......................... 362/31
6,669,349 B2 * 12/2003 Mabuchi ...................... 362/31

FOREIGN PATENT DOCUMENTS

JP           A 2000-11723         1/2000

* cited by examiner

Primary Examiner—Stephen F. Husar
(74) Attorney, Agent, or Firm—Oliff & Berridge, PLC

(57) ABSTRACT

There is provided a spread illuminating apparatus to make effective utilization of light emitted from a light source. A light reflection plate is provided along and close to a side surface of a light conductive member opposite to a side surface facing a transparent substrate, and has on a surface thereof a plurality of prismatic projections facing toward the light conductive member and arrayed along the longitudinal direction thereof. A reflection layer is formed on the projections. Light having penetrated inclined walls at the light conductive member is reflected by means of the reflection layer along the optical axis to be effectively utilized.

16 Claims, 5 Drawing Sheets

SPREAD ILLUMINATING APPARATUS WITH LIGHT REFLECTION MEMBER

BACKGROUND OF THE INVENTION

1. Field of the Invention

The present invention relates to a spread illuminating apparatus, and particularly to a spread illuminating apparatus used as an illuminating means for a liquid crystal display.

2. Description of the Related Art

A liquid crystal display (hereinafter referred to as "LCD") featuring low profile and light-weight has been increasingly used mainly for personal computers and cellular phones. However, since a liquid crystal which is a structural element of the "LCD" does not emit light by itself unlike a light-emitting type element such as a CRT, the LCD requires a separate illuminating means of observing an image. In particular, to satisfy recent growing demand for lower profile and lower electric power consumption, a thin plate-like spread illuminating apparatus of side light type (light-conductive plate type) is often used as an illuminating means for irradiating the LCD.

The applicants of the present invention disclosed one embodiment of such a spread illuminating apparatus of side light type in Japanese Patent Laid-open No. 2000-11723. FIGS. 5 and 6 show such a spread illuminating apparatus 1.

In FIG. 5, the spread illuminating apparatus 1 is generally composed of a transparent substrate 2 made of a light-transmissible material and a bar-like light source disposed along and close to an end surface 3 of the transparent substrate. The transparent substrate 2 is rectangular, is plate-like, and has a light reflection pattern 5 formed on one surface thereof (an upper side in FIG. 5).

The light source 4 is generally composed of a bar-like light conductive member 6 made of a transparent material and disposed along and close to the end surface 3 of the transparent substrate 2, and a spot-like light source 7 disposed at an end surface 6c of the light conductive member 6.

The light conductive member 6 is provided with an optical path conversion means 8. The optical path conversion means 8 includes a plurality of grooves 9 shaped, for example, triangular (as shown in FIG. 6) in section, extending in the thickness direction (vertical direction in FIG. 5) of the light conductive member 6, and located on a side surface 6b opposite to a side surface 6a facing the end surface 3 of the transparent substrate 2 and allows light rays emitted from the spot-like light source 7 to substantially uniformly enter the end surface 3 of the transparent substrate 2. To realize uniform spread emission, the depth of the grooves 9 triangular in section is set to gradually increase in proportion to the increase in distance from the spot-like light source 7.

A light reflection member 10 substantially U-shaped in section and having a light reflection layer (not shown) formed on an inner surface thereof is provided so as to cover longitudinal surfaces of said light conductive member 6 except the side surface 6a and also a proximal portion (a portion along the end surface 3) of the transparent substrate 2. The light reflection member 10 improves the efficiency of the light utilization through the light conductive member 6.

In addition to the above function, the light reflection member 10 connects the light conductive member 6 with the transparent substrate 2 by a predetermined strength.

In the spread illuminating apparatus 1, as shown in FIG. 6, light emitted into the light conductive member 6 is reflected at an inclined wall 9a defining the groove 9 along an optical axis A at the transparent substrate 2 (in the direction orthogonal to the length of the light conductive member 6) and enters the transparent substrate 2 so as to be effectively used as frontlight (FL) or backlight (BL) (that is, it becomes effective light). On the other hand, some portion of the light having entered the light conductive member 6 penetrates the inclined wall 9a, becoming leakage light B. The leakage light B having penetrated the inclined wall 9a is reflected by the light reflection member 10 with some portion thereof entering the transparent substrate 2 along the direction of the optical axis A and becoming effective light in a way mentioned above. However, since the remaining portion thereof becomes a component of an oblique direction and cannot be used as frontlight or backlight, that is, it becomes non-effective light.

On the spread illuminating apparatus 1, the characteristics of light amount were examined using a luminance meter (not shown) by varying a field angle θ, and the characteristic curve shown in FIG. 7 was obtained. This helps grasp the generation of the effective light and the non-effective light.

Specifically, the luminance meter is disposed over the transparent substrate 2 so as to be turnable on the central axis (not shown) extending orthogonal to the length of the light conductive member 6, and the amount of light emitted from the transparent substrate 2 is measured with the field angle (a turning angle) θ being varied.

The amount of light varies in a wave-like manner according to a field angle θ as shown in FIG. 7. Specifically, a large wave appears at a field angle θ of 0° or close to 0° (hereinafter referred to as "0° neighborhood area"), a small wave appears at a field angle θ of 60° to 70° (hereinafter referred to as "60°–70° neighborhood area"), and the line connecting the large wave and the small wave caves in.

The large wave corresponds to the effective light and the small wave corresponds to the non-effective light.

In this connection, even in the spread illuminating apparatus provided with a light conductive member 6A having an optical path conversion means 8A comprising a plurality of grooves 11 triangular in section and a plurality of flat portions 12 each formed between two adjacent grooves as shown in FIG. 8, the generation of non-effective light cannot be prevented for the reason described above, so that light cannot be effectively used as frontlight or backlight.

SUMMARY OF THE INVENTION

The present invention has been made in light of the above problems, and it is an object of the present invention to provide a spread illuminating apparatus capable of more effectively using light emitted from a light source.

In order to solve the above problems, according to a first aspect of the present invention, in a spread illuminating apparatus which includes a rectangular transparent substrate made of a light-transmissible material, and a bar-like light source comprising a bar-like light conductive member made of a transparent material and provided along one end surface of the transparent substrate and a spot-like light source disposed on an end of the light conductive member, a light reflection member, which has on a surface thereof a plurality of projections each forming a prism and having a reflection layer formed thereon so as to reflect light coming from the light conductive member, is disposed along and close to a side surface of the light conductive member opposite to a side surface facing the transparent substrate.

According to a second aspect of the present invention, in the configuration mentioned in the first aspect, the reflection layer is made of a metal film or a dielectric multi-layer film.

According to a third aspect of the present invention, in the configuration mentioned in the first or second aspect, the plurality of projections are shaped identical with one another.

According to a fourth aspect of the present invention, in the configuration mentioned in the first to third aspects, each of the projections forms a substantially triangular prism, and an angle formed by a surface of each of the projections positioned toward the spot-like light source and by a plane parallel to a major surface of the light reflection member is set to range between 20° and 45°.

According to a fifth aspect of the present invention, in the configuration mentioned in the fourth aspect, the spot-like light source is provided on both ends of the light conductive member, and each of the projections forms an isosceles-triangular prism.

According to a sixth aspect of the present invention, in the configuration mentioned in the first to third aspects, each of the projections forms a substantially arc-shaped prism.

According to a seventh aspect of the present invention, in the configuration mentioned in the sixth aspect, the spot-like light source is provided on both ends of the light conductive member.

DESCRIPTION OF THE PREFERRED EMBODIMENTS

Figure 1:
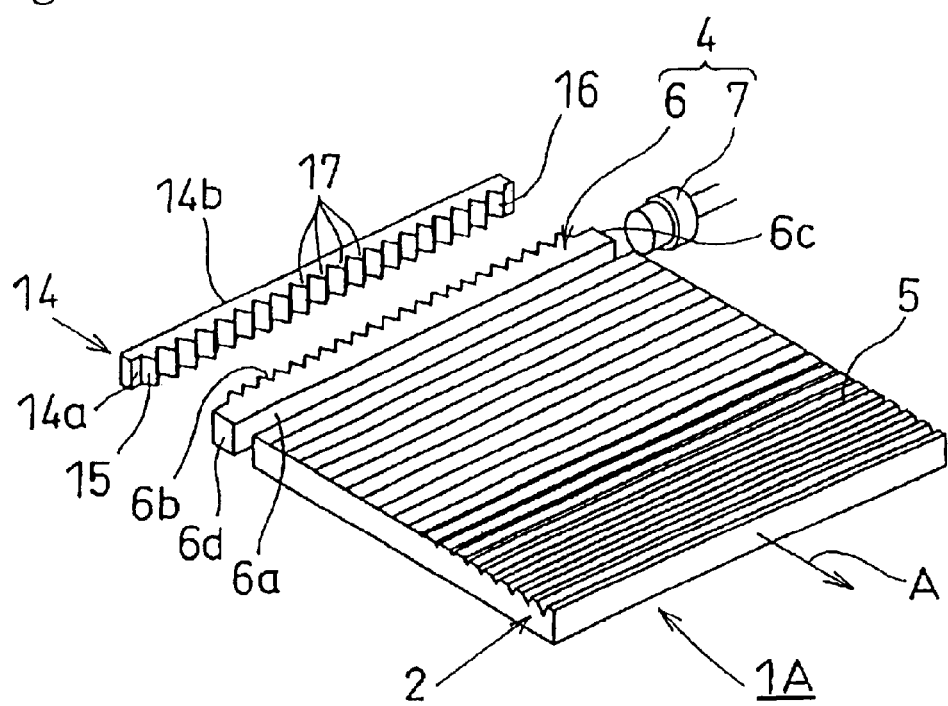
FIG. 1 is an exploded perspective view of a spread illuminating apparatus according to an embodiment of the present invention.
Figure 5:
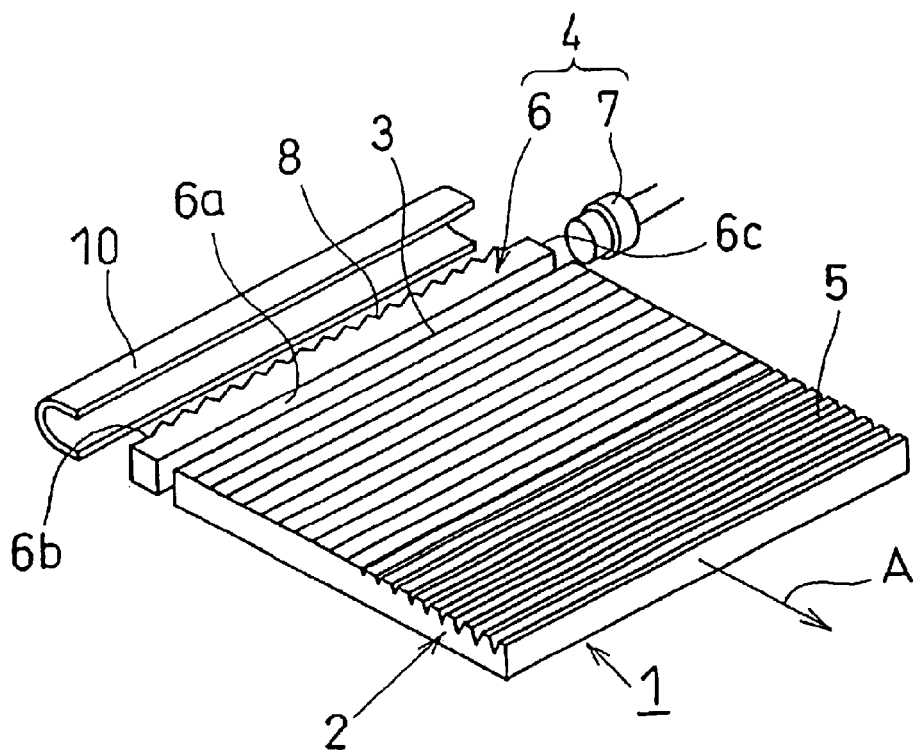
FIG. 5 is an exploded perspective view showing an example of a conventional spread illuminating apparatus.
Figure 6:
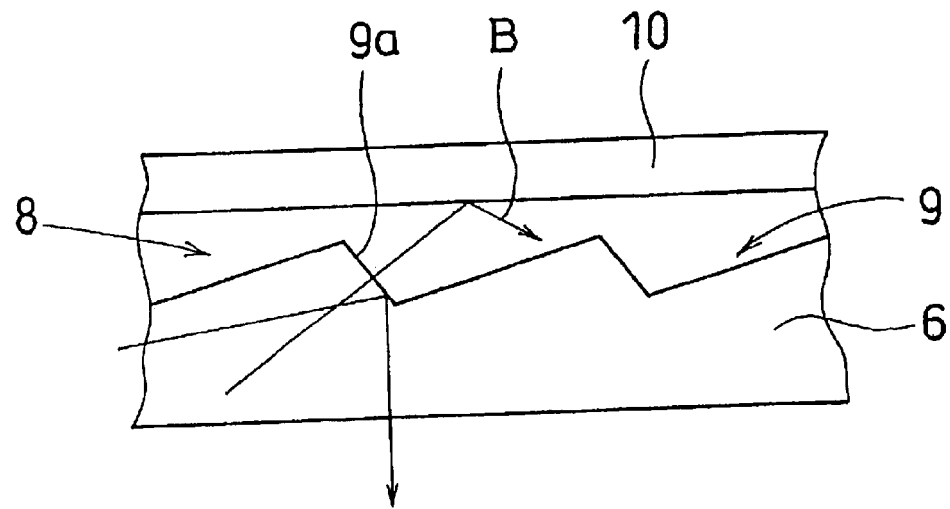
FIG. 6 shows schematically a light conductive member, a light reflection plate and optical paths of the conventional spread illuminating apparatus shown in FIG. 5.

A spread illuminating apparatus 1A according to a first embodiment of the present invention will be hereinafter explained, referring to FIG. 1. The main difference of the spread illuminating apparatus 1A from a conventional spread illuminating apparatus shown in FIGS. 5 and 6 is that a light reflection plate 14 having an array of projections 15 (hereinafter referred to as a "prism array 15" coated with a reflection layer 16) thereon is provided in place of a light reflection member 10. The components identical with or corresponding to those in the prior art shown in FIGS. 5 and 6 are represented by the same reference numerals and detailed descriptions thereof are omitted.

Figure 2A:
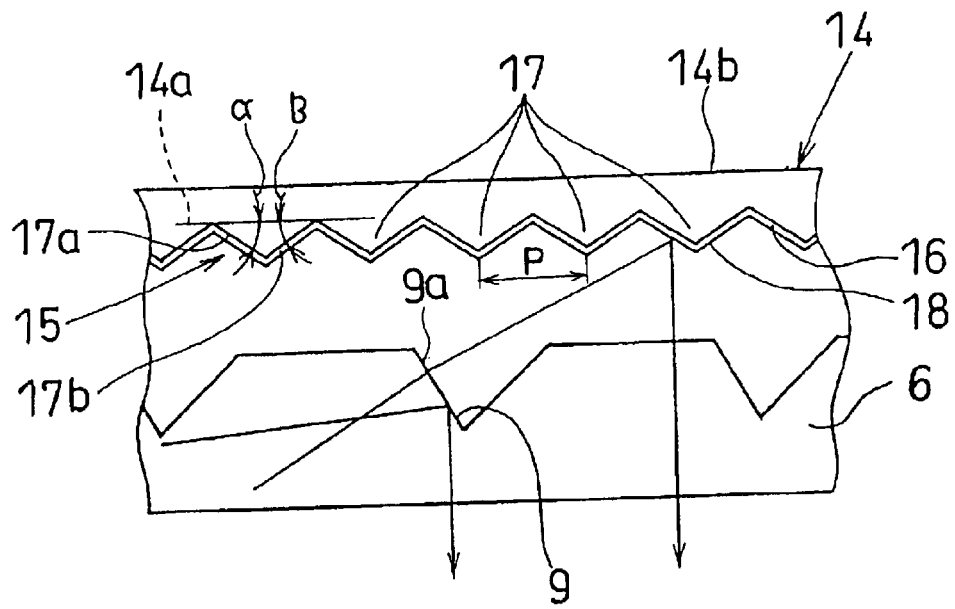
FIGS. 2A and 2B show schematically a light conductive member, a light reflection plate and an optical path of the spread illuminating apparatus shown in FIG. 1.
Figure 2B:
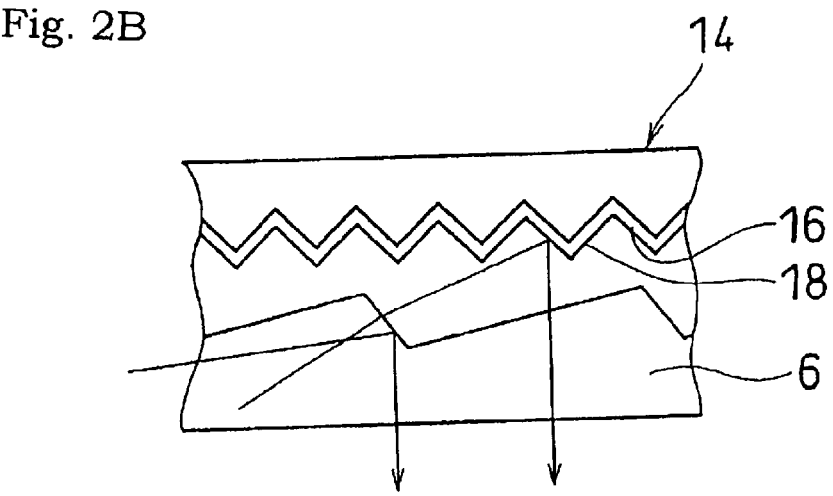

The light reflection plate 14 is made of a polycarbonate, shaped corresponding to a light conductive member 6, and dimensioned with, for example, a length of 40 mm, a thickness of 1 mm, and a width of 0.5 mm. The light reflection plate 14 faces a surface 6b of the light conductive member 6 opposite to a surface 6a facing a transparent substrate 2, and is disposed parallel to the light conductive member 6. In order to form the prism array 15, a plurality of prismatic (triangular prismatic) projections 17 extending in the direction orthogonal to the optical axis A (the front toward the back of the page) and arranged in the lengthwise direction of the light reflection plate 14 are disposed on a surface of the light reflection plate 14 facing the light conductive member 6 (hereinafter referred to as "first surface 14a"). The plurality of projections 17 are shaped identical with one another. An optical path conversion means is formed on the surface 6b of the light conductive member 6. The optical path conversion means shown in FIG. 2A comprises a plurality of V-shaped grooves and a plurality of flat portions formed therebetween whereas the optical path conversion means shown in FIG. 2B comprises only a plurality of V-shaped grooves.

Each of the projections 17 forms an isosceles-triangular prism. An angle $\alpha$ (hereinafter referred to as "first angle") formed by a surface 17a of each of the projections 17 positioned toward a spot-like light source 4 (hereinafter referred to as "first surface of the projection") and by a first plane 14a of the light reflection plate 14 (constituting a surface of a light reflection member according to the fourth aspect of the present invention) is set to range between 30° and 35°. In this connection, the first angle $\alpha$ may be set to range between 20° and 45°. An angle $\beta$ (hereinafter referred to as "second angle") formed by a surface 17b of each of the projections 17 opposite to the first surface 17a (hereinafter referred to as "second surface of the projection") and by the first plane 14a of the light reflection plate is identical with the first angle $\alpha$, and each of the projections 17 forms an isosceles-triangular prism.

A pitch P (a distance between vertexes of any two adjacent projections) of the prism array 15 is set to range between 0.01 mm and 0.5 mm. The pitch P is set not to exceed 0.5 mm to avoid a possible uneven light emission and is set not to be less than 0.01 mm lest to keep away from increase in the influence of the diffraction.

The reflection layer 16 made of a metal film of aluminum is formed on the prism array 15 by means of vapor deposition. Silver may be used in place of aluminum for the reflection layer 16. In addition, a protective film 18 made of a transparent material such as $SiO_2$ is formed on a surface of the reflection layer 16.

The first angle $\alpha$ is set to range between 30° and 35° for the following reason. The inventors of the present invention set a luminance meter in a similar manner described above and examined the characteristics of the relationship between the field angle $\theta$ and the light amount by varying the first angle $\alpha$ of each of the projections 17. When the first angle $\alpha$ was set to range between 20° and 45°, the light amount at 0° neighborhood area increased, which allowed the inventors to obtain a satisfactory characteristic result shown in FIG. 3. And, a more satisfactory characteristic result was obtained when the first angle $\alpha$ was set to range between 30° and 35°. Based on the above results, the first angle $\alpha$ is set to range between 30° and 35° in the present invention.

Figure 3:
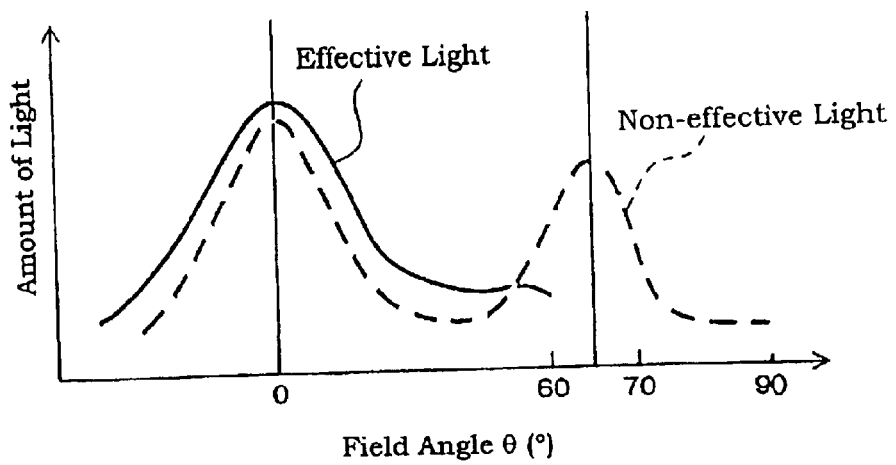
FIG. 3 shows characteristic curves of the relationship between the field angle and the light amount of the spread illuminating apparatus shown in FIG. 1.
Figure 7:
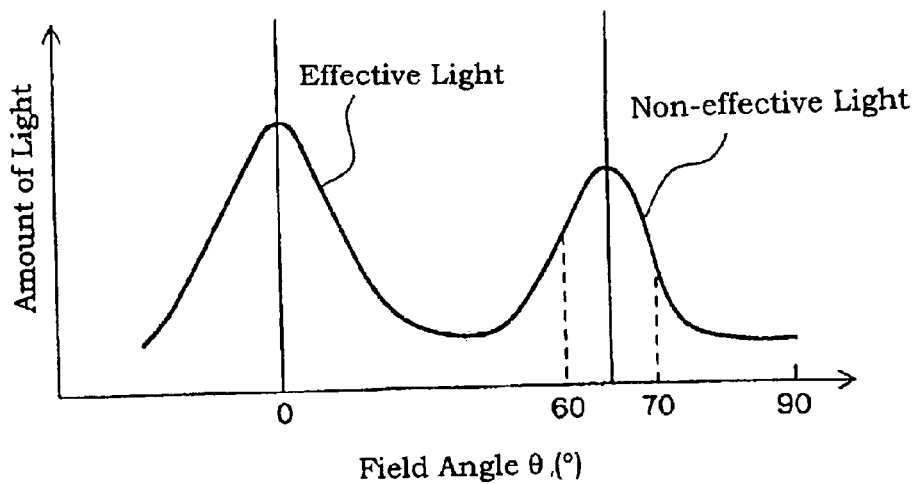
FIG. 7 shows a characteristic curve of the relationship between the field angle and the light amount of the spread illuminating apparatus shown in FIG. 5.
Figure 8:
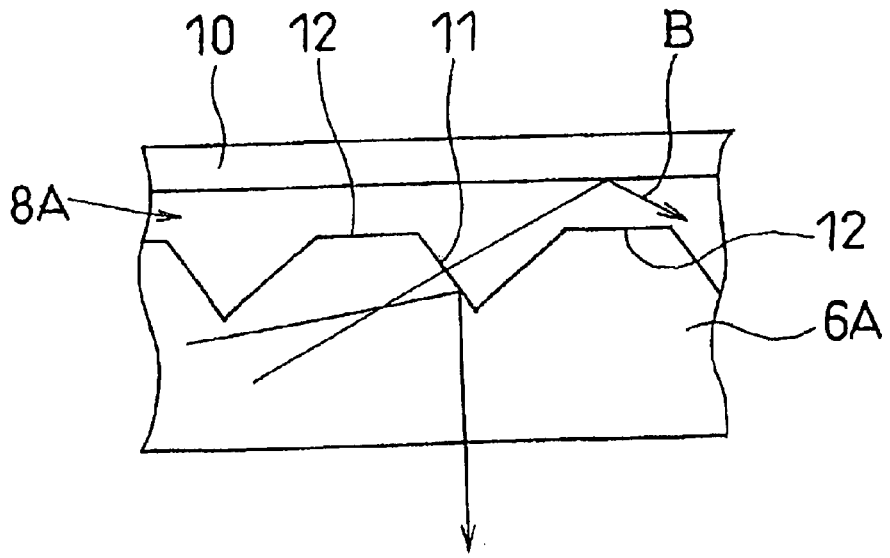
FIG. 8 shows schematically another type of light conductive member in place of the light conductive member shown in FIG. 6, a light reflection plate and optical paths.

When comparing the characteristic shown in FIG. 3 with that of the prior art shown in FIG. 7, it appears that non-effective light conventionally generated at the 60°–70° neighborhood area of the field angle is suppressed and the light corresponding to the non-effective light shifts to the 0° neighborhood area of the field angle, thereby increasing the amount of light at the 0° neighborhood area from the level shown by a broken line to that shown by a solid line as shown in FIG. 3.

In the spread illuminating apparatus 1A, light having penetrated the inclined walls 9a of the light conductive member 6 (the leakage light B) is reflected at the reflection layer 16 formed on the prism array 15 in the direction of the optical axis A, thereby providing the possibility of increasing effective light. The conventional light reflection member 10 has not effectively reduced the non-effective light, and therefore light emitted from the light source 4 has not been effectively utilized. In the present embodiment, the generation of the non-effective light can be minimized, so that the light emitted from the light source 4 can be utilized more effectively.

According to the present embodiment, the first angle α of each of the projections 17 is set to range between 30° and 35°, then the amount of light at the 0° neighborhood area of the field angle increases as hereinbefore described, and excellent characteristic of light amount can be ensured.

By shaping the plurality of projections 17 of the prism array 15 identical with one another, the prism array 15, that is, the light reflection plate 14 can be easily machined, which improves the productivity. However, the projections 17 do not have to be shaped identical with one another.

The pitch P of the prism array 15 is set to range between 0.01 mm and 0.5 mm, which suppresses the generation of uneven light emission and the increase in influence of diffraction.

In the above embodiment, the spot-like light source 7 is disposed on one end 6c of the light conductive member 6, but another spot-like light source may be additionally disposed on the other end 6d thereof. In this case, an optical path of light from the additional spot-like light source disposed on the other end 6d is substantially symmetric to the optical path of light from the spot-like light source 7 disposed on the one end 6c, which gives effect equivalent to that described above. The grooves in the optical path conversion means of the light conductive member 6 do not have to be V-shaped, but may be shaped, for example, trapezoidal or circular.

In the above embodiment, each of the projections 17 of the prism array 15 forms an isosceles triangle in section, but may alternatively form a non-isosceles triangle such that the second angle β and the apex angle are set to be different from those of the above embodiment.

Furthermore, in the above embodiment, the reflection layer 16 is made of a metal film, but may alternatively be made of an increase-reflection film of a dielectric multi-layer film ($SiO_2/Ta_2O_5$ type, $SiO_2/TiO_2$ type, etc.) or a diffuse-reflection film having some diffusibility.

In the above embodiment, the protective film 18 made of $SiO_2$ is formed on the surface of the reflection layer 16. The material of the protective film 18 is not limited to $SiO_2$, and may be light-transmissible inorganic or resin material. This protective film 18 may be removed.

Further, in the above embodiment, the prism array 15 is formed on the first plane 14a of the light reflection plate 14, but may alternatively be formed on a second plane 14b of the light reflection plate 14 made of a transparent material, opposite to the first plane 14a with a reflection layer being formed on the surface of the prism array 15. The light reflection plate 14 does not have to be made of a resin material such as a polycarbonate, but may alternatively be made of a material having the reflection characteristic such as metal. In this configuration, a reflection layer is not required.

Figure 4:
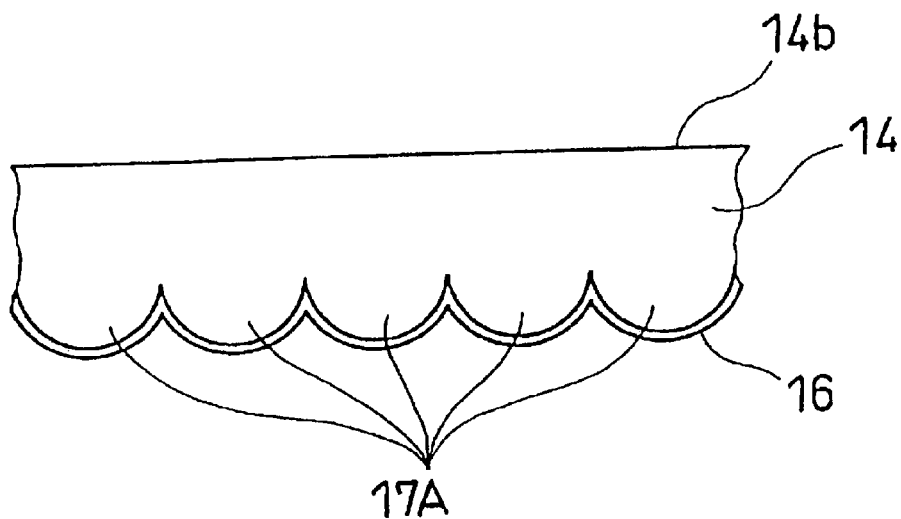
FIG. 4 shows schematically a light reflection plate having substantially arc-shaped prismatic projections.

In the above embodiment, each of the projections 17 is a triangular prism, but may alternatively be a substantially arc-shaped prism as shown in FIG. 4. With this configuration, the light reflection plate 14 can be easily manufactured.

In the above configuration, the spot-like light source 4 may be disposed on both end surfaces of the light conductive member 6. In this case, the optical paths from the spot-like light sources 4 on both the end surfaces are substantially symmetric to each other.

The projections are not necessarily parallel to one another in the thickness direction (vertical direction), and may be inclined with respect to the thickness direction in order to diminish unevenness in brightness. The projections do not have to be formed entirely over the first plane 14a of the reflection plate, but may be partially formed to improve brightness distribution.

In the above embodiment, the rectangular light reflection plate 14 constitutes a light reflection member, but may be replaced by a light reflection member 10 substantially U-shaped in section as shown in FIG. 5, with an array of projections being formed on an inner surface thereof facing the light conductive member. Alternatively, a light reflection member substantially square U-shaped in section may be used, with an array of projections being formed on an inner surface thereof facing the light conductive member.

In the present invention, light having penetrated the grooves of the light conductive member is reflected at the reflection layer formed on the prism array of the light reflection member in the direction of the optical axis of the transparent substrate so as to increase the amount of effective light. With the conventional light reflection member, much non-effective light traveling toward the large field angle is generated, resulting in hindrance of effective utilization of light. With the light reflection member of the present invention, the generation of non-effective light is minimized, and light from the light source can be effectively utilized.

When the projections are shaped identical with one another, the light reflection member can be easily manufactured, which improves the productivity.

What is claimed is:

1. A spread illuminating apparatus, which includes a rectangular transparent substrate made of a light-transmissible material and a bar-like light source comprising a bar-like light conductive member made of a transparent material and provided along an end surface of said rectangular transparent substrate and a spot-like light source disposed on an end of said light conductive member, wherein a light reflection member, which has on a surface thereof a plurality of projections each forming a prism, said plurality of projections having a reflection layer formed thereon so as to reflect light coming from said light conductive member, is disposed along and close to a side surface of said light conductive member opposite to a side surface facing said transparent substrate.

2. A spread illuminating apparatus according to claim 1, wherein said reflection layer is made of a metal film.

3. A spread illuminating apparatus according to claim 1, wherein said reflection layer is made of a dielectric multi-layer film.

4. A spread illuminating apparatus according to claim 1, wherein said plurality of projections are shaped identical with one another.

5. A spread illuminating apparatus according to claim 1, wherein said plurality of projections each form a substantially triangular prism, and an angle formed by a surface of each of said projections positioned toward said spot-like light source and by a plane parallel to a major surface of said light reflection member is set to range between 20° and 45°.

6. A spread illuminating apparatus according to claim 5, wherein said spot-like light source is provided on both ends of said light conductive member, and said plurality of projections each form an isosceles-triangular prism.

7. A spread illuminating apparatus according to claim 1, wherein said plurality of projections each form a substantially arc-shaped prism.

8. A spread illuminating apparatus according to claim 7, wherein said spot-like light source is provided on both ends of said light conductive member.

9. A spread illuminating apparatus according to claim 2, wherein said plurality of projections are shaped identical with one another.

10. A spread illuminating apparatus according to claim 3, wherein said plurality of projections are shaped identical with one another.

11. A spread illuminating apparatus according to claim 2, wherein said plurality of projections each form a substantially triangular prism, and an angle formed by a surface of each of said projections positioned toward said spot-like light source and by a plane parallel to a major surface of said light reflection member is set to range between 20° and 45°.

12. A spread illuminating apparatus according to claim 3, wherein said plurality of projections each form a substantially triangular prism, and an angle formed by a surface of each of said projections positioned toward said spot-like light source and by a plane parallel to a major surface of said light reflection member is set to range between 20° and 45°.

13. A spread illuminating apparatus according to claim 4, wherein said plurality of projections each form a substantially triangular prism, and an angle formed by a surface of each of said projections positioned toward said spot-like light source and by a plane parallel to a major surface of said light reflection member is set to range between 20° and 45°.

14. A spread illuminating apparatus according to claim 2, wherein said plurality of projections each form a substantially arc-shaped prism.

15. A spread illuminating apparatus according to claim 3, wherein said plurality of projections each form a substantially arc-shaped prism.

16. A spread illuminating apparatus according to claim 4, wherein said plurality of projections each form a substantially arc-shaped prism.

\* \* \* \* \*